United States Patent [19]

Kim

[11] Patent Number: 4,569,232

[45] Date of Patent: Feb. 11, 1986

[54] REACTION MASS FLOWMETER

[75] Inventor: Raymond K. Kim, Canton, Ohio

[73] Assignee: The Babcock & Wilcox Company, New Orleans, La.

[21] Appl. No.: 656,210

[22] Filed: Oct. 1, 1984

[51] Int. Cl.[4] .................................. G01F 1/74
[52] U.S. Cl. ........................ 73/861.04; 73/195; 73/861.72
[58] Field of Search .......... 73/861.04, 861.72, 861.73, 73/195

[56] References Cited

U.S. PATENT DOCUMENTS 2,897,672  8/1950  Glasbrenner et al. ............ 73/861.72
3,293,913 12/1966  Hannon ............................ 73/861.72

Primary Examiner—Donald O. Woodiel
Attorney, Agent, or Firm—Vytas R. Matas; Robert J. Edwards

[57] ABSTRACT

A flowmeter particularly adapted for measuring the mass flow rate of a mixture of pulverized coal and air. An orifice flowmeter is located in a conduit carrying the mixture, and a reaction mass flowmeter is connected to the conduit either upstream or downstream of the orifice flowmeter. The reaction mass flowmeter includes inner and outer elbows with the inner elbow fixed at one end and free at the other, with a load cell mounted thereon to measure the reaction force caused by the change of direction of the mixture as it transits the elbow.

8 Claims, 2 Drawing Figures

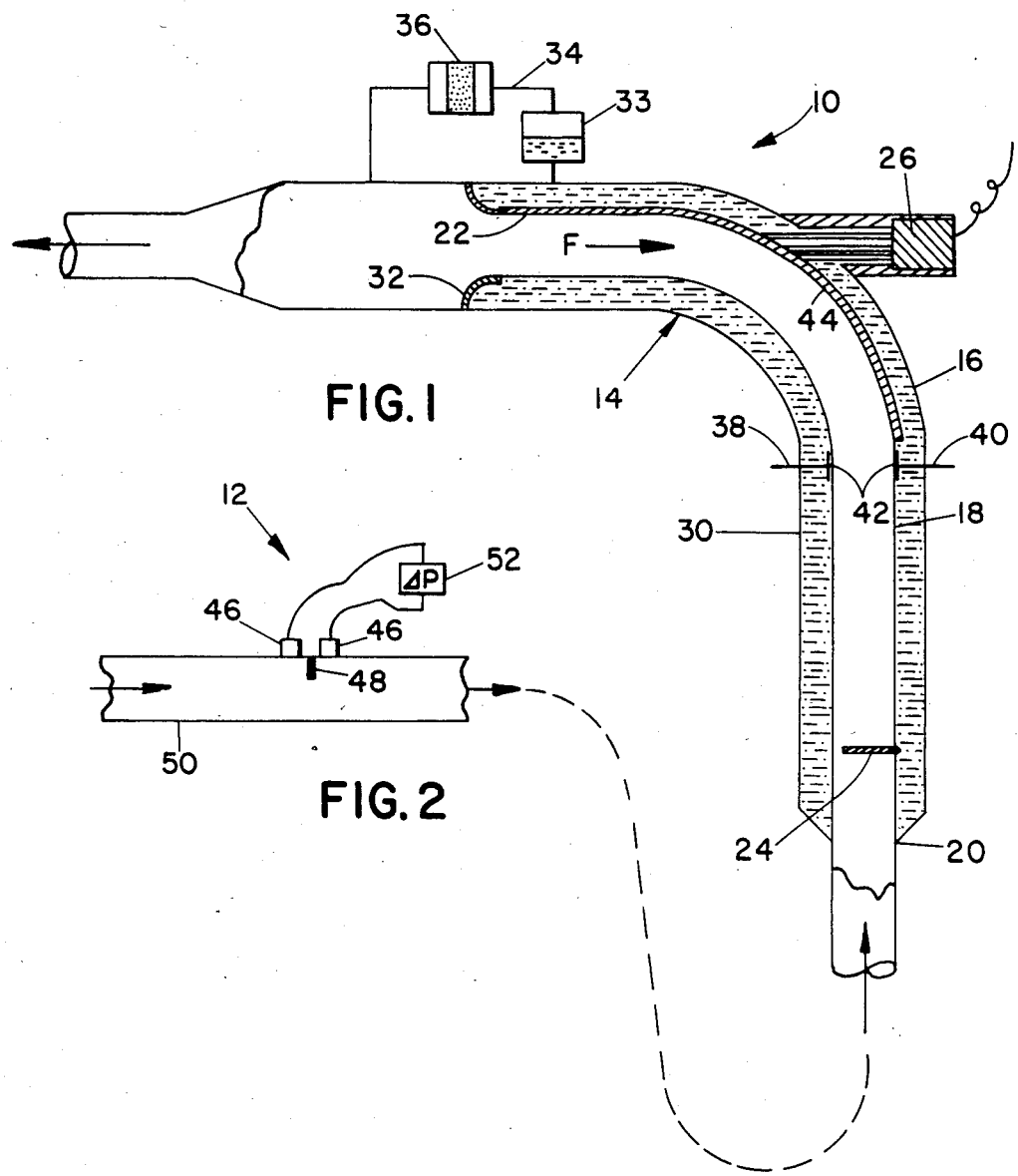

REACTION MASS FLOWMETER

TECHNICAL FIELD

The present invention relates to flowmeters, and more particularly to a reaction mass flowmeter for pulverized coal.

BACKGROUND ART

A common approach to the measurement of mass flow rate of solid particles in a pneumatic conveying system has been to measure the volumetric flow rate (Q) or the bulk velocity (V) of the mixture, measure the bulk density ($\rho$) of the mixture, and then combine the two measurements in order to determine the mass flow rate ($\dot{m}$) of the mixture:

$$\dot{m} = \rho Q = \rho V A$$

where A is equal to the cross-sectional area of the pipe.

Direct measurement of the volumetric flow rate is complicated by the velocity of the particles being different from that of the air, which is known as "slip velocity". The slip velocity of an entrained solid particle depends mainly on the size and shape of the particles within the same transport system. It is extremely difficult, however, to measure with reasonable accuracy the slip velocities of all the individual particles in any flow system. Attempts have been made to estimate the "average" slip velocity of the particles, however, this approach requires knowledge of the particle size distribution, which is not readily done in-situ. Moreover, determination of the bulk density of the mixture is not a straightforward operation because of the spatial and temporal mal-distribution of the particles. Accordingly, the synthesizing approach has not been successful.

In an earlier known form of a reaction mass flowmeter the reaction force generated by the flow momentum is measurable by one or more strain gauges attached to the flexure point of a 90 degree elbow concentrically placed inside another elbow. The reacting inside elbow is fixed at the upstream end, and the downstream end is unsupported so that it can translate in response to the flow momentum and vibrate freely at its natural frequency. The steady output of the strain gauge is a measure of the flow momentum, while the fluctuating component can be analyzed for its natural frequency, which is a function of the density of the mixture passing through the elbow section. While such an arrangement can be expected to work well with relatively dense mixtures, such as coal slurries of water or oil, it is not considered to be practical for lightly loaded pneumatic systems such as pulverized coal transport lines, at least partially due to the fact that the large mass of the elbow compared to the relatively small changes in the density makes such a system too insensitive to be useful.

SUMMARY OF THE INVENTION

In accordance with the present invention, an orifice flowmeter is used to measure the air flow rate independent of the solids concentration, and a load cell is used to detect the reaction force. In this arrangement the reaction force at the elbow and the differential pressure across the orifice meter are measured, and then used to calculate the mass flow rate of the mixture, the mass flow rate of the air, and the mass flow rate of the pulverized coal or other solid.

The orifice meter is designed to measure the air flow rate, ignoring the solid particles in the system. The reaction force measured at the elbow is an indication of the sum total momentum generated by the air and the coal particles emerging from the elbow. It is recognized that many of the coal particles could be moving a lower velocities than the air, however, the difference between the actual velocities of the coal particles and the velocity of the air is used in reducing the data and can be compensated by a calibration factor (or equation) as explained below:

(a) Velocity of the air, $V_a$, is determined by:

$$Q = C\sqrt{\Delta P/\rho a} \qquad (1)$$

where
Q = volumetric rate of flow
$\Delta p$ = differential pressure across orifice flowmeter
$\rho a$ = density of air
C = meter coefficient (=cA)

$$V_a = Q/A \qquad (2)$$

where
A = cross-sectional area of pipe (b) Reaction force, F, measured at the elbow is:

$$F = \rho m \, QVm \qquad (3)$$

where
$\rho m$ = density of the mixture
$V_m$ = velocity of the mixture (c) Mass flow rate of the mixture, $\dot{m}_m$, is calculated by:

$$\dot{m}_m = F/V_a = \rho m \, QV_m/V_a \qquad (4)$$

It is recognized that $V_m/V_a \neq 1$, however, a calibration factor (K) can be derived based on experimental data such that $K\,V_m/V_a = 1$ whereby the mass flow rate can be determined by:

$$\dot{m}_m = KF/V_a \qquad (5)$$

(d) Mass flow rate of the coal, $\dot{m}_c$, is calculated by:

$$\dot{m}_c = \dot{m}_m - \dot{m}_a \qquad (6)$$

where mass flow rate of air, $\dot{m}_a = \rho a Q$

Thus, the mass flow rate of the mixture can be determined with two relatively simple measurements, and a calibration factor or equation.

An important advantage of the system of the invention is that it does not require detailed knowledge of the particle size, slip velocity or the mixture density, all of which are very difficult to measure. The two basic measurements, the air flow rate and the reaction force, not only give the mixture and the air flow rates, but also the coal mass flow rate as well.

BRIEF DESCRIPTION OF THE DRAWINGS

FIG. 1 is a sectional view of the reaction force measurement of the invention; and FIG. 2 is a schematic view of the differential pressure measurement element of the invention.

DESCRIPTION OF THE PREFERRED EMBODIMENT

Referring to the drawings, in which like reference characters designate like or corresponding parts throughout the several views, there is illustrated a reaction mass flowmeter system comprising the combination of a reaction force measurement element designated generally by the numeral 10 in FIG. 1, and a differential pressure measurement element designated generally by the numeral 12 in FIG. 2.

Referring to FIG. 1, the reaction force measurement element 10 comprises an elbow assembly 14 which is part of a piping system carrying a mixture of, for example, pulverized coal and air. The elbow assembly includes an outer elbow 16 and an inner elbow 18. The inner elbow is anchored to the outer elbow at a point 20, and has a free end 22. A flexure point or hinge is made integral with the inner elbow 18 in the form of an elastomeric seal 24 connecting separate sections of the inner elbow. A load cell 26 is attached to the outer elbow 16, attached to the inner elbow 18. In accordance with known characteristics of such devices, the change in direction which the fluid undergoes as it flows through the elbow assembly 14 results in a reaction force F, indicated by the arrow in FIG. 1, acting on the inner elbow 18, which is proportional to the density and the velocity of the mixture, the force being measured by the load cell 26.

Under some conditions, excessive vibration of the inner elbow can occur. Accordingly, the present invention provides a liquid in the annular space 30 between the inner and outer elbows to dampen such vibrations. The connection between the elbows at the restrained end of the inner elbow can be a fixed connection, such as by welding, however, the free end 22 of the inner elbow is connected to the outer elbow by means of a flexible seal element 32. To compensate for expansion, a reservoir 33 is connected between the annular space 30 and the outlet of the elbow assembly 14 by a pressure equalization line 34, which includes a filter 36.

In order to physically restrain the inner elbow 18 in the event of excessive vibration amplitude, a plurality of restrainers 38 (e.g. six to eight) are disposed between the inner and outer elbows. The actual configuration of these restrainers is not critical to the invention, but can be in the form of rods 40 extending through and attached to the outer elbow, and plates 42 attached to the ends of the rods and normally spaced from the inner elbow.

The present invention also includes means to compensate for the erosion of the inner surface of the inner elbow when abrasive mixtures such as one containing pulverized coal are being measured. Such means includes a wear plate 44 fixed to the inside of the inner elbow 18, which prevents premature wear-through of the elbow. Since the change in weight of the elbow will affect the force measurement, the load cell 26 includes means to rezero it whenever the flow is shut off.

The pressure differential can be measured either upstream or downstream of the elbow assembly by known means. In accordance with a preferred embodiment, as shown in FIG. 2, first and second diaphragm-type sealed pressure taps 46 are located on opposite sides of a segmented orifice plate 48 located in a horizontal run 50 of the piping system of which the elbow assembly 14 is a part. The pressure taps are connected to a pressure differential readout element 52, in a known manner.

In operation, the mass flow rates can be measured using equations (1) to (6), using the force measurement determined by means of the reaction force measuring element 10, and the pressure differential as measured by the differential pressure measurement element 12, as described in detail above.

Certain modifications and improvements will occur to those skilled in the art upon reading the foregoing description. It will be understood that all such improvements and modifications have been deleted herein for the sake of conciseness and readability, but are properly within the scope of the following claims. As an example of one such modification, the present invention would work equally well with the flow direction reversed from that shown in FIGS. 1 and 2.

I claim:

1. Apparatus for measuring the mass flow rate of a mixture of solids and air flowing within a conduit comprising an orifice flowmeter within said conduit; means to measure the pressure differential across said orifice flowmeter;. and a reaction mass flowmeter connected to said conduit; said reaction mass flowmeter comprising an inner elbow having a first inlet end attached to said conduit, and a free outlet end, an outer elbow surrounding said inner elbow and attached at one end to said inner elbow adjacent said first end and at its opposite end to said conduit, and a load cell having a sensing element attached to said inner elbow in position to sense the reaction force applied to said inner elbow by said fluid as the fluid changes direction as it flows through said elbow.

2. Apparatus as defined in claim 1, in which said means to measure the differential pressure comprises first and second diaphragm-type sealed pressure taps disposed on opposite sides of said orifice plate.

3. Apparatus as defined in claims 1 or 2, including means for sealing the annular space defined between said inner and outer elbows, said annular space being filled with a damping fluid.

4. Apparatus as defined in claim 3, in which said outer elbow is fixedly attached to said inner elbow adjacent said first end, and including a flexible connection between said outer elbow and said inner elbow at the free end of said inner elbow.

5. Apparatus as defined in claim 4, including a pressure equalization line connected between said annular space and said conduit downstream of said annular space, and an expansion reservoir connected in said line.

6. Apparatus as defined in claim 1, in which said inner elbow is segmented adjacent said inlet end, comprising a first segment attached to said conduit, a second coaxial segment, and flexible means connecting said first and second segments.

7. Apparatus as defined in claim 1, including a wear plate attached to at least a portion of the interior of said inner elbow in the area of the bend thereof.

8. Apparatus as defined in claim 1 including restraining means attached to said outer elbow and positioned to contact said inner elbow when the inner elbow deflects more than a predetermined amount.

* * * * *